Oct. 3, 1961  F. AKUTOWICZ  3,002,741
HYDRAULIC DAMPER
Filed Jan. 30, 1961
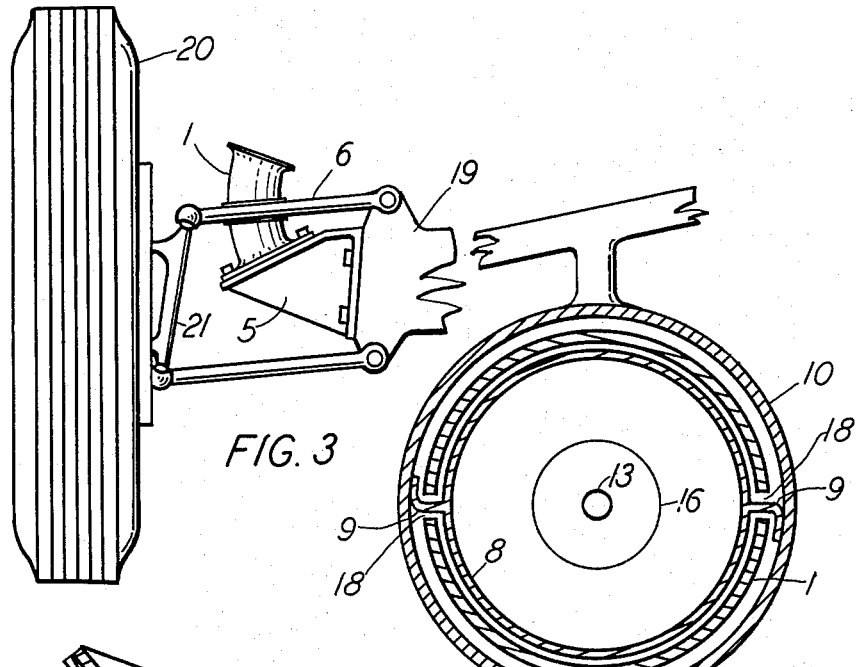
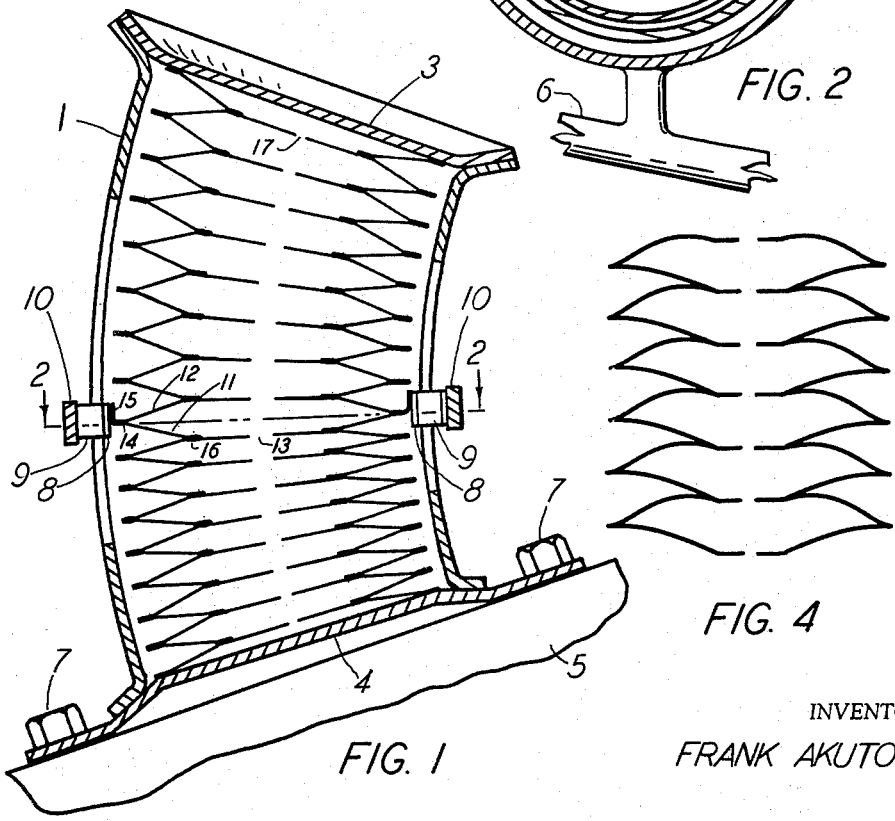
INVENTOR.
FRANK AKUTOWICZ

United States Patent Office 3,002,741
Patented Oct. 3, 1961

3,002,741
HYDRAULIC DAMPER
Frank Akutowicz, 2007 Harvey Road,
Wilmington 3, Del.
Filed Jan. 30, 1961, Ser. No. 85,589
4 Claims. (Cl. 267—8)

This invention relates to a hydraulic damper useful in damping vibratory motion such as the motion of the chassis of a vehicle excited by the bump and rebound motion of the wheels. The invention discloses three advances in shock absorber technology:

(1) The fluid is completely sealed within a metallic bellows this eliminating sources of wear and leakage at sliding shaft seals, since there are no sliding seals and no rubbing or rotating parts.

(2) The energy dissipative function is distributed over a number of restrictive orifices instead of concentrated at a single orifice. The practical consequence is that the orifices can be manufactured with wider tolerances, which means substantial economies in manufacture without any corresponding loss in product performance or durability.

(3) In its preferred embodiment the invention is inherently suited for economical automated production because most of the components are made of sheet metal stampings seam welded together.

In the drawing FIGURE 1 shows the bellows supported top and bottom by an enveloping frame bolted on the bottom to a fixed machine part. FIGURE 2 is section 2—2 of FIGURE 1. FIGURE 3 is an embodiment of the invention as an automobile shock absorber. The fixed part of the damper corresponds to the vehicle chassis and the moving part to the upper control arm of the wheel suspension. FIGURE 4 shows a combination spring and damper as a single maintenance free unit. The component diaphragms are dished to provide the necessary spring force.

FIGURE 1 shows a reinforcing ring 8 welded to the central portion of the bellows. This reinforcing ring moves with the moving machine part such that the relative motion between the fixed and moving part (which is the motion to be damped) corresponds to a deformation of the bellows. A quantity of de-gassed fluid is trapped within the bellows, and as the bellows deforms the fluid moves through the orifices from the contracting part of the bellows to the expanding part. At each orifice a jet of fluid is formed and the resulting eddies and vortices start the conversion of mechanical energy of motion into heat. The conversion is completed as the eddies and vortices decay. The energy conversion occurs at each orifice and consequently there is a nearly uniform dissipation of energy throughout the fluid instead of the concentrated dissipation in one orifice as in conventional dampers. The practical consequences of this fact are that the fluid velocities can be lower and the orifices made with less precision. The lower velocities mean lower pressures and less wear and tear on the structure. The movement of fluid through a series of orifices one after the other is an essentially novel feature of this invention not possible to attain in the conventional dash-pot shock absorber which contains only a single rigid expanding cavity and a single rigid contracting cavity between which the fluid is exchanged. In the present invention the deformation of the bellows is spread throughout the length of the bellows and the deformation of the fluid is necessarily likewise spread out. If a series of orifices is used in a conventional damper nothing is gained for the extra manufacturing effort because the resistance of the entire series of orifices must be the same as for a single orifice because the same particles of fluid pass through all the orifices.

In detail FIGURE 1 shows the enveloping frame 1 with ends closed by plates 3 and 4 seam welded to 1. 5 is a fixed machine part and 6 a moving part, and it is assumed that relative vertical motion between 5 and 6 is the motion to be damped. Bolts 7 hold frame 1 to the fixed part, and ring 8, welded clips 9, and ring 10 connect the central portion of the bellows to the moving part 6. Diaphragms 11 and 12 are seam welded together at their outer peripheries at 14. In addition diaphragm 11 has an extra lip 15 for welding to ring 8. The other diaphragms in the bellows do not have the extra lip 15. Orifice 13 is formed in the central portion of diaphragm 12 and alternate diaphragms are welded on their inner peripheries at 16. Because a larger quantity of fluid moves through orifices like 13 in the central part of the bellows than through the end orifices 17, a refinement in the invention is to make the orifices diminish in diameter from 13 to 17. A further refinement offsets adjacent orifices slightly such that the fluid jet from one orifice does not impinge on the center of the adjacent orifice. This refinement increases the turbulence in the fluid and permits a smaller size bellows to produce the same damping effect. Frame 1 has slots 18, shown in FIGURE 2, through which clips 9 pass. In FIGURE 3, 19 is the chassis of the vehicle, 20, a wheel, and 21 the steering knuckle. In this embodiment the invention damps the vertical motion of the wheel 20 with respect to the chassis 19. FIGURE 4 is a modification of the bellows such that the invention can be used as a spring as well as a damper. The modification comprises dishing the individual diaphragms as shown diagrammatically in FIGURE 4. The dishing stiffens the bellows so that it serves as a spring as well as a fluid deforming means.

I claim:

1. In a hydraulic damper interposed between a fixed machine part and a movable machine part the combination of an enveloping frame with closed ends, a bellows assembly supported between said closed ends, a quantity of fluid trapped within said bellows assembly, said bellows assembly comprising a sequence of annular diaphragms seam welded together, the inner peripheries of alternate diaphragms forming restrictive orifices, a reinforcing ring, means for attaching said reinforcing ring to the central portion of said bellows assembly, means for attaching said enveloping frame to said fixed machine part, means for attaching said reinforcing ring to said movable machine part.

2. A hydraulic damper as defined in claim 1 wherein adjacent orifices are offset with respect to each other.

3. A hydraulic damper as defined in claim 1 wherein said orifices progressively diminish in diameter from the central portion of said bellows towards the ends of said bellows.

4. A hydraulic damper as defined in claim 1 wherein said annular diaphragms are dished.

References Cited in the file of this patent

UNITED STATES PATENTS 2,534,123  Hasselhorn _____ Dec. 12, 1950

FOREIGN PATENTS 267,245  Switzerland _____ June 1, 1950